(12) United States Patent  (10) Patent No.: US 6,799,552 B2
Crowell et al.  (45) Date of Patent: Oct. 5, 2004

(54) SYSTEM AND METHOD FOR CONTROLLING ENGINE OPERATION

(75) Inventors: Thomas J. Crowell, Peoria, IL (US); David Andrew Pierpont, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/247,642

(22) Filed: Sep. 20, 2002

(65) Prior Publication Data

US 2004/0055564 A1 Mar. 25, 2004

(51) Int. Cl.$^7$ .............................................. F02D 13/02
(52) U.S. Cl. ..................... 123/316; 123/90.16
(58) Field of Search ............... 123/316, 90.12, 123/90.15, 90.16

(56) References Cited

FOREIGN PATENT DOCUMENTS

| EP | 1076163 | 2/2001 |
|----|---------|--------|
| EP | 1160421 | 12/2001 |
| EP | 1231372 | 8/2002 |

*Primary Examiner*—Henry C. Yuen
*Assistant Examiner*—J A Benton
(74) *Attorney, Agent, or Firm*—Finnegan, Henderson, Farabow, Garrett & Dunner

(57) ABSTRACT

A system for operating an internal combustion engine includes an intake valve moveable between a first position at which fluid is blocked from flowing to or from the cylinder and a second position at which fluid is allowed to pass to or from the cylinder. The system includes a fluid actuator selectively operable to hold the intake valve from moving to the first position during a portion of a compression stroke and a control valve configured to control fluid flow between a source of fluid and the fluid actuator. A fuel supply system supplies a predetermined amount of fuel to the cylinder at an appropriate time during an engine cycle based on at least one engine operating parameter, and a controller determines a need to de-rate the engine based on a sensed parameter relating to source fluid viscosity during a cycle in which the fluid actuator is not operated.

30 Claims, 3 Drawing Sheets

SYSTEM AND METHOD FOR CONTROLLING ENGINE OPERATION

TECHNICAL FIELD

The present disclosure is directed to a system and method for controlling the operation of an engine. More particularly, the present disclosure is directed to a system and method for de-rating an engine.

BACKGROUND

The operation of an internal combustion engine, such as, for example, a diesel, gasoline, or natural gas engine, may cause the generation of undesirable emissions. These emissions, which may include particulates and nitrous oxide ($NO_x$), are generated when fuel is combusted in a combustion chamber of the engine. An exhaust stroke of an engine piston forces exhaust gas, which may include these emissions, from the engine. If no emission reduction measures are in place, these undesirable emissions will eventually be exhausted to the environment.

Research is currently being directed towards decreasing the amount of undesirable emissions that are exhausted to the environment during the operation of an engine. It is expected that improved engine design and improved control over engine operation may lead to a reduction in the generation of undesirable emissions. Many different approaches, such as, for example, engine gas recirculation and aftertreatments, have been found to reduce the amount of emissions generated during the operation of an engine. Unfortunately, the implementation of these emission reduction approaches typically results in a decrease in the overall efficiency of the engine.

Additional efforts are being focused on improving engine efficiency to compensate for the efficiency loss due to the emission reduction systems. One such approach to improving the engine efficiency involves adjusting the actuation timing of the engine valves. For example, the actuation timing of the intake and exhaust valves may be modified to implement a variation on the typical diesel or Otto cycle known as the Miller cycle. In a "late intake valve closing" type Miller cycle, the intake valves of the engine are held open during a portion of the compression stroke of the piston.

However, a late intake valve closing Miller cycle may be undesirable under certain operating conditions. For example, a diesel engine operating on a late intake valve closing Miller cycle will be difficult to start when the engine is cold. This difficulty arises because diesel fuel combustion is achieved when an air and fuel mixture is compressed to a certain pressure and temperature. Implementation of the late intake valve closing Miller cycle reduces the amount of air and the amount of compression within each combustion chamber. The reduced compression combined with the reduced temperature of the engine results in a lower maximum pressure and temperature of the air and fuel mixture. Thus, achieving combustion in a cold engine operating on a late intake valve closing Miller cycle may prove difficult.

In addition, during cold operation, hydraulic motors may hold the intake valves open beyond the time of normal closing as compared to during warm operation. During cold engine operating conditions, the viscosity of the oil is greater than desirable, resulting in inadequate fluid flow and inconsistent intake valve actuator operation. Thus, intake valves may not be actuated in normal operation during cold engine conditions. However, because highly pressurized air may be supplied to the cylinder, normal operation may increase the pressure level within cylinder above desirable level. As a result, damage may occur to the engine, for example, the cylinder, turbochargers, etc.

The method and system for controlling engine operation disclosed herein solves one or more of the problems set forth above.

SUMMARY OF THE INVENTION

In one aspect, the present disclosure is directed to a system for operating an internal combustion engine that includes an intake valve moveable between a first position at which fluid is blocked from flowing to or from the cylinder and a second position at which fluid is allowed to pass to or from the cylinder. The system includes a fluid actuator selectively operable to hold the intake valve from moving to the first position during a portion of a compression stroke of the engine, a source of fluid in communication with the fluid actuator, and a control valve configured to control a flow of fluid between the source of fluid and the fluid actuator. A fuel supply system is configured to supply a predetermined amount of fuel to the cylinder at an appropriate time during an engine cycle based on at least one operating parameter of the engine, and a controller is configured to determine a need to de-rate the engine based on a sensed parameter relating to viscosity of fluid from the source during an engine cycle in which the fluid actuator is not operated.

In another aspect, the present disclosure is directed to a method for controlling operation of an engine having a piston moveable in a cylinder of the engine. The method includes moving an intake valve between a first position at which fluid is blocked from flowing to or from the cylinder and a second position at which fluid is allowed to pass to or from the cylinder during an intake stroke of the piston, and selectively operating a control valve to hold the intake valve from moving to the first position during at least a portion of the compression stroke of the piston. The method further includes sensing at least one operating parameter of the engine relating to viscosity of a fluid supplied to the control valve and determining a need to de-rate the engine based on the sensed parameter relating to viscosity and the selective operation of the control valve.

In still another aspect, the present disclosure is directed to an engine including a block defining at least one cylinder and a cylinder head having at least one intake passageway leading to the at least one cylinder. The engine includes at least one intake valve moveable between a first position at which fluid is blocked from flowing to or from the cylinder and a second position at which fluid is allowed to pass to or from the cylinder, a fluid actuator configured to selectively hold the intake valve from moving to the first position during at least a portion of a compression stroke of the engine, and a source of fluid in fluid communication with the fluid actuator. The engine also includes a control valve disposed between the source of fluid and the fluid actuator and moveable between a first position to block a flow of fluid between the source of fluid and the fluid actuator and second position to allow the flow of fluid from the source of fluid to the fluid actuator. The engine further includes a fuel supply system configured to supply a predetermined amount of fuel to the cylinder at an appropriate time during an engine cycle based on at least one operating parameter of the engine. A controller may be electrically coupled to the control valve and the fuel supply system, and the controller may be configured to actuate the control valve and to reduce the amount of fuel based on the sensed parameter during an engine cycle in which the fluid actuator is not operated.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
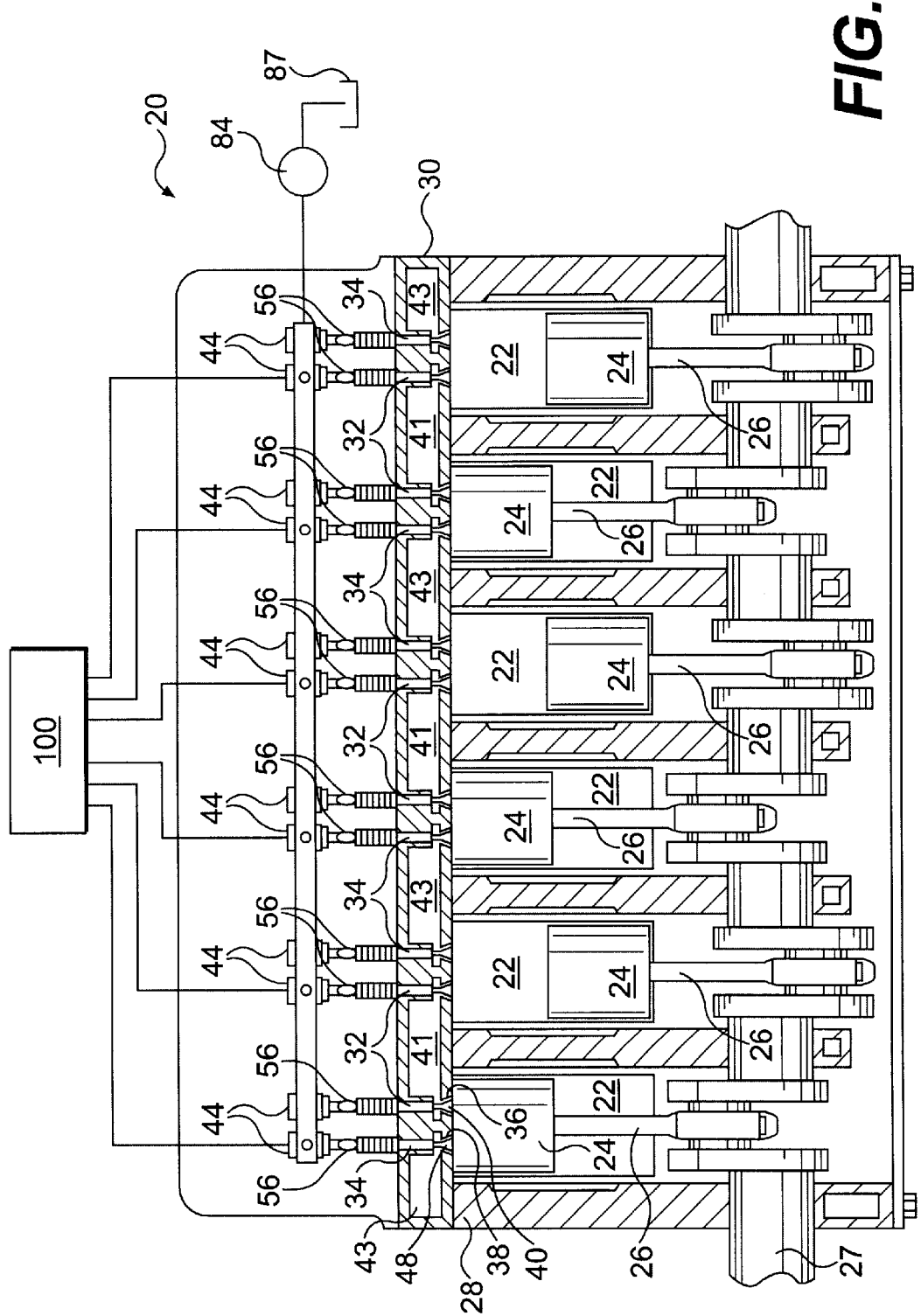
FIG. 1 is a schematic and diagrammatic cross-sectional view of an exemplary embodiment of an internal combustion engine.

An exemplary embodiment of an internal combustion engine 20 is illustrated in FIG. 1. For the purposes of the present disclosure, the engine 20 is depicted and described as a four stroke diesel engine. One skilled in the art will recognize, however, that the engine 20 may be any other type of internal combustion engine, such as, for example, a gasoline or natural gas engine.

As illustrated in FIG. 1, the engine 20 includes an engine block 28 that defines a plurality of cylinders 22. A piston 24 is slidably disposed within each cylinder 22. In the illustrated embodiment, the engine 20 includes six cylinders 22 and six associated pistons 24. One skilled in the art will readily recognize that the engine 20 may include a greater or lesser number of pistons 24 and that the pistons 24 may be disposed in an "in-line" configuration, a "V" configuration, or any other conventional configuration.

As also shown in FIG. 1, the engine 20 includes a crankshaft 27 that is rotatably disposed within the engine block 28. A connecting rod 26 connects each piston 24 to the crankshaft 27. Each piston 24 is coupled to the crankshaft 27 so that a sliding motion of the piston 24 within the respective cylinder 22 results in a rotation of the crankshaft 27. Similarly, a rotation of the crankshaft 27 will result in a sliding motion of the piston 24. For example, an uppermost position of the piston 24 in the cylinder 22 corresponds to a top dead center position of the crankshaft 27, and a lowermost position of the piston 24 in the cylinder 22 corresponds to a bottom dead center position of the crankshaft 27.

As one skilled in the art will recognize, the piston 24 in a conventional, four-stroke engine cycle reciprocates between the uppermost position and the lowermost position during a combustion (or expansion) stroke, an exhaust stroke, and an intake stroke, and a compression stroke. Meanwhile, the crankshaft 27 rotates from the top dead center position to the bottom dead center position during the combustion stroke, from the bottom dead center to the top dead center during the exhaust stroke, from top dead center to bottom dead center during the intake stroke, and from bottom dead center to top dead center during the compression stroke. Then, the four-stroke cycle begins again. Each piston stroke correlates to about 180° of crankshaft rotation, or crank angle. Thus, the combustion stroke may begin at about 0° crank angle, the exhaust stroke at about 180°, the intake stroke at about 360°, and the compression stroke at about 540°.

The engine 20 also includes a cylinder head 30. The cylinder head 30 defines an intake passageway 41 that leads to at least one intake port 36 for each cylinder 22. The cylinder head 30 may further define two or more intake ports 36 for each cylinder 22. The intake passageway 41 receives pressurized air from an air supply system (not shown) such as, for example, a turbocharger or series turbochargers.

An intake valve 32 is disposed within each intake port 36. The intake valve 32 includes a valve element 40 that is configured to selectively block the intake port 36. As described in greater detail below, each intake valve 32 may be actuated to move or "lift" the valve element 40 to thereby open the respective intake port 36. In a cylinder 22 having a pair of intake ports 36 and a pair of intake valves 32, the pair of intake valves 32 may be actuated by a single valve actuation assembly or by a pair of valve actuation assemblies.

The cylinder head 30 also defines at least one exhaust port 38 for each cylinder 22. Each exhaust port 38 leads from the respective cylinder 22 to an exhaust passageway 43. The cylinder head 30 may further define two or more exhaust ports 38 for each cylinder 22.

An exhaust valve 34 is disposed within each exhaust port 38. The exhaust valve 34 includes a valve element 48 that is configured to selectively block the exhaust port 38. As described in greater detail below, each exhaust valve 34 may be actuated to move or "lift" the valve element 48 to thereby open the respective exhaust port 38. In a cylinder 22 having a pair of exhaust ports 38 and a pair of exhaust valves 34, the pair of exhaust valves 34 may be actuated by a single valve actuation assembly or by a pair of valve actuation assemblies.

Figure 2:
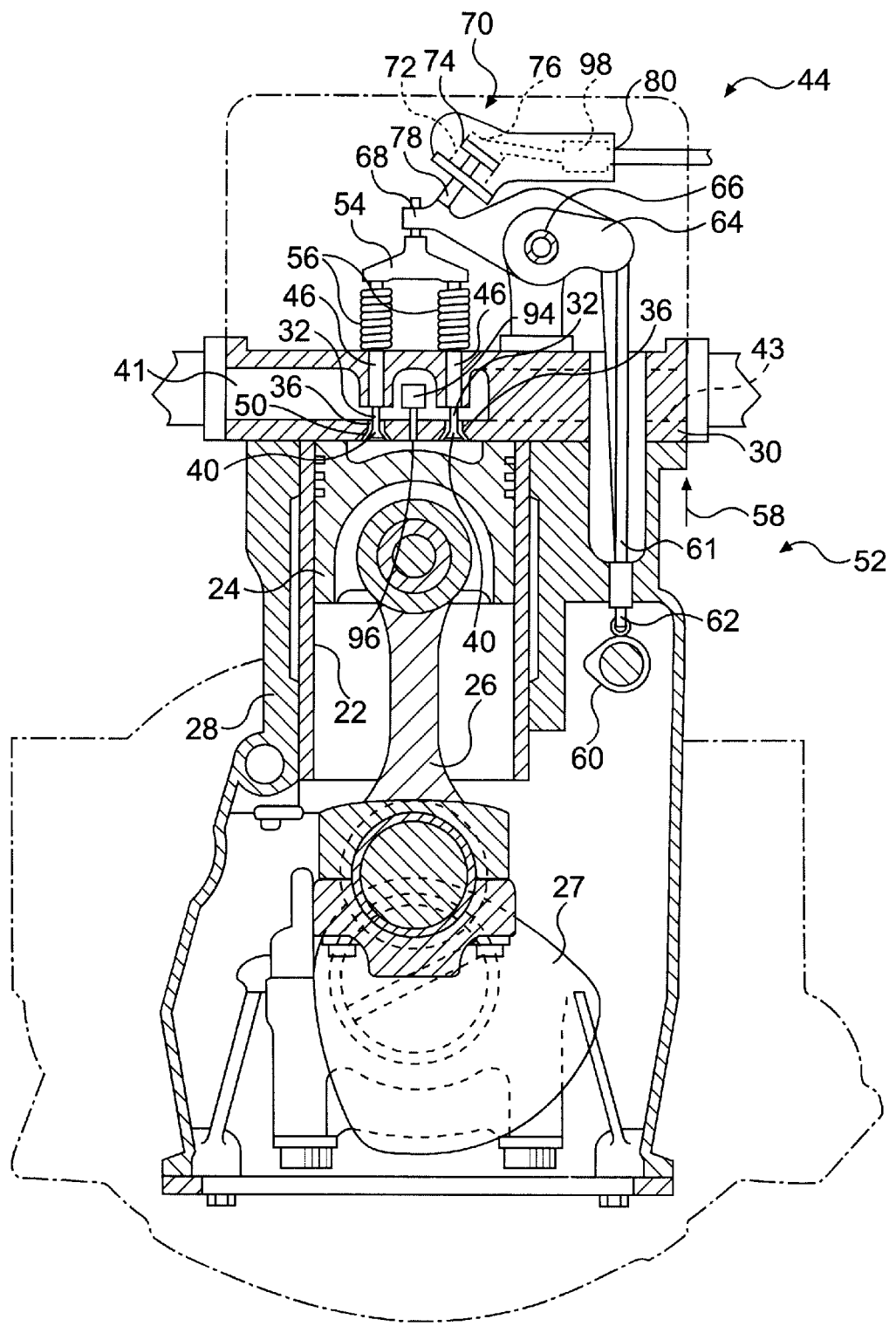
FIG. 2 is a schematic and diagrammatic cross-sectional view of a cylinder and valve actuation assembly in accordance with an exemplary embodiment of the present invention.

FIG. 2 illustrates an exemplary embodiment of one cylinder 22 of the engine 20. As shown, the cylinder head 30 defines a pair of intake ports 36 connecting the intake passageway 41 to the cylinder 22. Each intake port 36 includes a valve seat 50. One intake valve 32 is disposed within each intake port 36. The valve element 40 of the intake valve 32 is configured to engage the valve seat 50. When the intake valve 32 is in a closed position, the valve element 40 engages the valve seat 50 to close the intake port 36 and block fluid flow relative to the cylinder 22. When the intake valve 32 is lifted from the closed position, the intake valve 32 allows a flow of fluid relative to the cylinder 22.

Similarly, the cylinder head 30 may define two or more exhaust ports 38 (only one of which is illustrated in FIG. 1) that connect the cylinder 22 with the exhaust passageway 43. One exhaust valve 34 is disposed within each exhaust port 38. A valve element 48 of each exhaust valve 34 is configured to close the exhaust port 38 when the exhaust valve 34 is in a closed position and block fluid flow relative to the cylinder 22. When the exhaust valve 34 is lifted from the closed position, the exhaust valve 32 allows a flow of fluid relative to the cylinder 22.

As also shown in FIG. 2, a valve actuation assembly 44 is operatively associated with the intake valves 32. The valve actuation assembly 44 includes a bridge 54 that is connected to each valve element 40 through a pair of valve stems 46. A spring 56 may be disposed around each valve stem 46 between the cylinder head 30 and the bridge 54. The spring 56 acts to bias both valve elements 40 into engagement with the respective valve seat 50 to thereby close each intake port 36.

The valve actuation assembly 44 also includes a rocker arm 64. The rocker arm 64 is configured to pivot about a pivot 66. One end 68 of the rocker arm 64 is connected to the bridge 54. The opposite end of the rocker arm 64 is connected to a cam assembly 52. In the exemplary embodiment of FIG. 2, the cam assembly 52 includes a cam 60 having a cam lobe and mounted on a cam shaft, a push rod 61, and a cam follower 62. One skilled in the art will recognize that the cam assembly 52 may have other configurations, such as, for example, where the cam 60 acts directly on the rocker arm 64

The valve actuation assembly 44 may be driven by the cam 60. The cam 60 is connected to the crankshaft 27 so that a rotation of the crankshaft 27 induces a corresponding rotation of the cam 60. The cam 60 may be connected to the crankshaft 27 through any means readily apparent to one skilled in the art, such as, for example, through a gear reduction assembly (not shown). As one skilled in the art will recognize, a rotation of the cam 60 will cause the cam follower 62 and associated push rod 61 to periodically reciprocate between an upper position and a lower position.

The reciprocating movement of the push rod 61 causes the rocker arm 64 to pivot about the pivot 66. When the push rod 61 moves in the direction indicated by arrow 58, the rocker arm 64 will pivot and move the bridge 54 in the opposite direction. The movement of the bridge 54 causes each intake valve 32 to lift and open the intake ports 36. As the cam 60 continues to rotate, the springs 56 will act on the bridge 54 to return each intake valve 32 to the closed position.

In this manner, the shape and orientation of the cam 60 controls the timing of the actuation of the intake valves 32. As one skilled in the art will recognize, the cam 60 may be configured to coordinate the actuation of the intake valves 32 with the movement of the piston 24. For example, the intake valves 32 may be actuated to open the intake ports 36 when the piston 24 is moving from top dead center to bottom dead center within the cylinder 22 to allow air to flow from the intake passageway 41 into the cylinder 22.

A similar valve actuation assembly may be connected to the exhaust valves 34. A second cam (not shown) may be connected to the crankshaft 27 to control the actuation timing of the exhaust valves 34. The exhaust valves 34 may be actuated to open the exhaust ports 38 when the piston 24 is advancing within the cylinder 22 to allow exhaust to flow from the cylinder 22 into the exhaust passageway 43.

As shown in FIG. 2, the valve actuation assembly 44 also includes a fluid actuator 70. The fluid actuator 70 includes an actuator cylinder 72 that defines an actuator chamber 76. An actuator piston 74 is slidably disposed within the actuator cylinder 72 and is connected to an actuator rod 78. A return spring (not shown) may act on the actuator piston 74 to return the actuator piston 74 to a home position. The actuator rod 78 is engageable with an end 68 of the rocker arm 64.

A fluid line 80 is connected to the actuator chamber 76. Pressurized fluid may be directed through the fluid line 80 into the actuator chamber 76 to move the actuator piston 74 within the actuator cylinder 72. Movement of the actuator piston 74 causes the actuator rod 78 to engage the end 68 of the rocker arm 64. Fluid may be introduced to the actuator chamber 76 when the intake valves 32 are in the open position to move the actuator rod 78 into engagement with the rocker arm 64 to thereby hold the intake valves 32 in the open position. Alternatively or additionally, fluid may be introduced to the actuator chamber 76 when the intake valves 32 are in the closed position to move the actuator rod 78 into engagement with the rocker arm 64 and pivot the rocker arm 64 about the pivot 66 to thereby open the intake valves 32.

Figure 3:
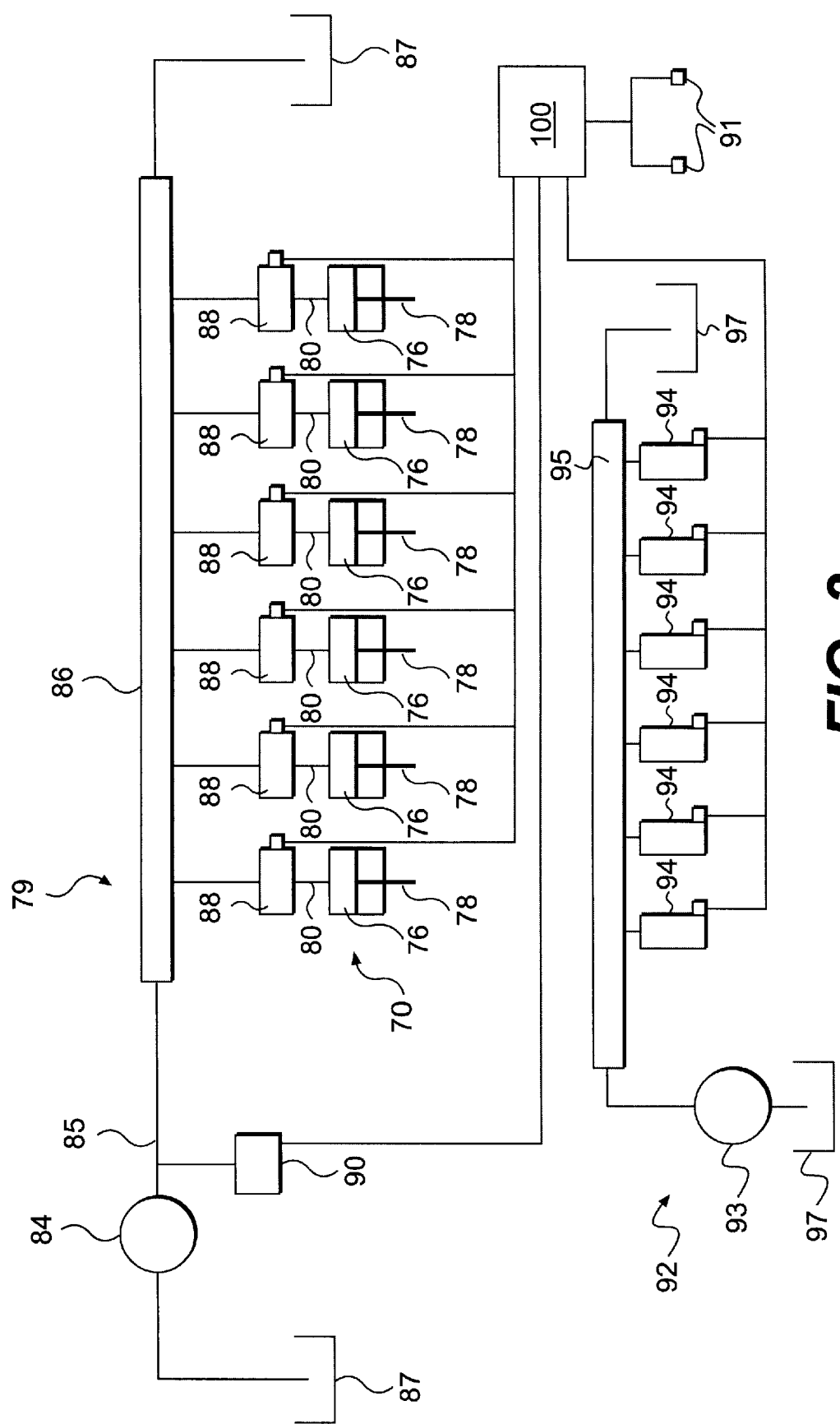
FIG. 3 is a schematic and diagrammatic representation of a fluid supply system and a fuel supply system for an engine in accordance with an exemplary embodiment of the present invention.

As illustrated in FIGS. 1 and 3, a source of fluid 84, which is connected to a tank 87, supplies pressurized fluid to the fluid actuator 70. The tank 87 may store any type of fluid readily apparent to one skilled in the art, such as, for example, hydraulic fluid, fuel, transmission fluid, or engine coolant. The source of fluid 84 may be part of a lubrication system, such as typically accompanies an internal combustion engine. Such a lubrication system may provide pressurized oil having an average pressure of, for example, less than 700 KPa (100 psi) or, more particularly, between about 210 KPa and 620 KPa (30 psi and 90 psi). Alternatively, the source of fluid may be a pump configured to provide oil at a higher pressure, such as, for example, between about 5 MPa and 35 MPa (1450 psi and 5000 psi).

A fluid supply system 79 connects the source of fluid 84 with the fluid actuator 70. In the exemplary embodiment of FIG. 3, the source of fluid 84 is connected to a fluid rail 86 through a fluid line 85. As illustrated in FIG. 3, the fluid rail 86 supplies pressurized fluid from the source of fluid 84 to a series of fluid actuators 70. Each fluid actuator 70 may be associated with either the intake valves 32 or the exhaust valves 34 of a particular engine cylinder 22 (referring to FIG. 1). The fluid lines 80 direct pressurized fluid from the fluid rail 86 into the actuator chamber 76 of each fluid actuator 70.

A control valve 88, for example, a directional control valve, may be disposed in each fluid line 80. Each control valve 88 may be opened to allow pressurized fluid to flow between the fluid rail 86 and the actuator chamber 76. Each control valve 88 may be closed to prevent pressurized fluid from flowing between the fluid rail 86 and the actuator chamber 76. The control valve 88 may be normally biased into a closed position and actuated to allow fluid to flow through the control valve 88. Alternatively, the control valve 88 may be normally biased into an open position and actuated to prevent fluid from flowing through the control valve 88. One skilled in the art will recognize that the control valve 88 may be any type of controllable valve, such as, for example, a solenoid-operated spool valve, a pilot-controlled spool valve, or any electrically-actuated valve.

One skilled in the art will recognize that the fluid supply system 79 may have a variety of different configurations. For example, the fluid supply system 79 may include one or more control valves and/or orifices (not shown) to build up pressure in the fluid rail 86, to bleed air from the fluid supply system 79, and/or to dampen oscillations in the actuator chamber 76 and/or the fluid line 80.

It should be appreciated that the fluid supply system 79 may include the source of fluid 84 at a low pressure and a separate source of high pressure fluid (not shown). The control valve 88 may then be configured to selectively connect either the source of fluid 84 or the source of high pressure fluid 92. In this manner, either low or high pressure fluid may be directed to the fluid actuator 70 to meet the needs of the current operating conditions.

Referring to FIG. 3, the engine 20 may include a fuel supply system 92. The fuel supply system 92 may include a fuel injector assembly 94, for example, a mechanically-actuated, electronically-controlled unit injector, in fluid communication with a common fuel rail 95. Alternatively, the fuel injector assembly 94 may be any common rail type injector and may be actuated and/or operated hydraulically, mechanically, electrically, piezo-electrically, or any combination thereof. A source of fuel 93, for example, a fuel pump, may supply fuel from a fuel tank 97 to the common fuel rail 95. The common fuel rail 95 provides fuel to the fuel injector assembly 94 associated with each cylinder 22. Referring now to FIG. 1, the fuel injector assembly 94 may inject or otherwise supply fuel into the cylinder 22 via the fuel port 96.

The fuel may be supplied into the cylinder 22 in accordance with a desired fuel injection timing. For example, for each engine cycle, the fuel injection timing may include a single injection or a combination of a pilot injection followed by a main injection. The amount of fuel to be supplied and the fuel injection timing may be based on one or more of the desired engine speed, sensed engine speed, engine load, air pressure at the intake passageway 41, and the like.

As shown in FIGS. 1 and 3, a controller 100 is connected to each valve actuation assembly 44 and to each fuel injector assembly 94. The controller 100 may include an electronic control module that has a microprocessor and a memory. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

The controller 100 may be programmed to control one or more aspects of the operation of the engine 20. For example, the controller 100 may be programmed to control the valve actuation assembly, the fuel supply system, and any other function readily apparent to one skilled in the art. The controller 100 may control the engine 20 based on the current operating conditions of the engine and/or instructions received from an operator.

The controller 100 may be further programmed to receive information from one or more sensors 90, 91 operatively connected with the engine 20. Each of the sensors 90, 91 may be configured to sense one or more operational parameters of the engine 20. For example, with reference to FIG. 3, the sensor 90 may be connected with the fluid supply system 79 to sense the temperature of the fluid within the fluid supply system 79.

One skilled in the art will recognize that many other types of sensors may be used in conjunction with, independently of, or alternatively to the sensor 90. For example, the engine 20 may be equipped with sensors 91 configured to sense the viscosity or one or more parameters indicative of the viscosity of the fluid within the fluid supply system 79, such as, for example, the temperature of the engine coolant, the temperature of the engine 20, the temperature in the intake passageway 41 and/or the exhaust passageway 43. The sensors 91 may also be configured to sense one or more of the following: the ambient air temperature, the engine speed, the load on the engine, the intake air pressure, and the desired engine speed.

One of the sensors 91 may be configured to monitor the crank angle of the crankshaft 27 to thereby determine the position of the pistons 24 between top and bottom dead center within their respective cylinders 22. The crank angle of the crankshaft 27 is also related to actuation timing of the intake valves 32 and the exhaust valves 34. Regarding the relationship between valve actuation timing and crank angle, exhaust valve actuation is timed to substantially coincide with the exhaust stroke of the piston 24, and intake valve actuation is timed to substantially coincide with the intake stroke of the piston 24.

INDUSTRIAL APPLICABILITY

Based on information provided by the engine sensors, the controller 100 may operate each valve actuation assembly 44 to selectively implement a late intake valve closing Miller cycle for each cylinder 22 of the engine 20. Under normal operating conditions, implementation of the late intake valve closing Miller cycle may increase the overall efficiency of the engine 20. The overall efficiency may be increased through the use of a high-efficiency turbocharger and/or series turbochargers to achieve a high system compression ratio, for example, at least 4:1 with respect to atmosphere.

Under some operating conditions, such as, for example, when the engine 20 is cold, the controller 100 may operate the engine 20 on a conventional diesel cycle. When the engine 20 is cold, the fluid being supplied from the fluid source 84 to the fluid actuators 70 may also be cold, and therefore, the viscosity of the fluid may be greater than a predetermined desired level. When the viscosity of the fluid is above the predetermined desired level, performance of the fluid actuators may be inconsistent and/or unpredictable. Therefore, a more consistent engine performance may result from operating the engine 20 on the conventional diesel cycle.

The following discussion describes the implementation of a late intake valve closing Miller cycle in a single cylinder 22 of the engine 20. One skilled in the art will recognize that the system of the present invention may be used to selectively implement a late intake valve closing Miller cycle in all cylinders 22 of the engine 20 in the same or a similar manner.

When the engine 20 is operating under normal operating conditions, the controller 100 implements a late intake valve closing Miller cycle by selectively actuating the fluid actuator 70 to hold the intake valve 32 open for a first portion of the compression stroke of the piston 24. This may be accomplished by moving the control valve 88 to the open position when the piston 24 starts an intake stroke. This allows pressurized fluid to flow from the source of fluid 84 through the fluid rail 86 and into the actuator chamber 76. The force of the fluid entering the actuator chamber 76 moves the actuator piston 74 so that the actuator rod 78 follows the end 68 of the rocker arm 64 as the rocker arm 64 pivots to open the intake valves 32. The distance and rate of movement of the actuator rod 78 will depend upon the configuration of the actuator chamber 76 and the fluid supply system 79. When the actuator chamber 76 is filled with fluid and the rocker arm 64 returns the intake valves 32 from the open position to the closed position, the actuator rod 78 will engage the end 68 of the rocker arm 64.

The fluid supply system 79 may be configured to supply a flow rate of fluid to the fluid actuator 70 to fill the actuator chamber 76 before the cam 60 returns the intake valves 32 to the closed position. When the actuator chamber 76 is filled with fluid, the controller 100 may close the control valve 88. This prevents fluid from escaping from the actuator chamber 76. As the cam 60 continues to rotate and the springs 56 urge the intake valves 32 towards the closed position, the actuator rod 78 will engage the end 68 of the rocker arm 64 and maintain the intake valves 32 in an open position. As long as the control valve 88 remains in the closed position, the trapped fluid in the actuator chamber 76 will resist the springs 56 from returning the intake valves 32 to the closed position. Thus, the fluid actuator 70 will stop the intake valves 32 from closing and maintain the intake valves in, for example, a fully- or partially-open position, independently of the action of the cam assembly 52.

When the actuator rod 78 engages the rocker arm 64 to prevent the intake valves 32 from closing, the force of the springs 56 acting through the rocker arm 64 may cause an increase in the pressure of the fluid within the fluid system 79. The controller 100 may close the intake valves 32 by opening the control valve 88. This allows the pressurized fluid to flow out of the actuator chamber 76. The force of the springs 56 forces the fluid from the actuator chamber 76, thereby allowing the actuator piston 74 to move within the actuator cylinder 72. This allows the rocker arm 64 to pivot so that the intake valves 32 are moved to the closed position.

As noted previously, certain operating conditions may require that the engine 20 be operated on a conventional diesel cycle instead of the late intake valve closing Miller cycle described above. These types of operating conditions may be experienced, for example, when engine 20 is first starting or is otherwise operating under cold conditions. The described valve actuation system 44 allows for the selective disengagement of the late intake valve closing Miller cycle.

In the exemplary embodiment of FIG. 3, the controller 100 may disengage the late intake valve closing Miller cycle by closing the control valve 88 at a time when the actuator chamber 76 is substantially empty. The control valve 88 may be closed when the controller 100 receives sensory input indicating that the engine 20 is starting or is operating under cold conditions. Closing the control valve 88 prevents fluid from flowing from the source of fluid 84 into the actuator chamber 76. Without the introduction of fluid to the actuator chamber 76, the fluid actuator 70 will not prevent the intake valves 32 from returning to the closed position in response to the force of the springs 56.

Thus, when the control valve 88 is closed, the intake valves 32 will follow a conventional diesel cycle as governed by the cam 60. In the conventional diesel cycle, intake valve actuation will follow a conventional closing. That is, the closing of the intake valves 32 substantially coincides with the end of the intake stroke of the piston 24. When the intake valves 32 close at the end of the intake stroke, no air will be forced from the cylinder 22 during the compression stroke. This results in the piston 24 compressing the fuel and air mixture to a higher pressure in the cylinder, which will facilitate diesel fuel combustion. This is particularly beneficial when engine 20 is operating in cold conditions.

If the fluid within the fluid rail 86 is cold, the fluid will have an increased viscosity. The increased viscosity of the fluid may decrease the rate at which the fluid may flow into and out of the actuator chamber 76 and thereby impact the operation of the valve actuator 70. By circulating fluid in the fluid rail 86 while the late intake valve closing Miller cycle is disengaged, the cold fluid may be replaced by warmer fluid from the source of fluid 84. This will eventually decrease the viscosity of the fluid within the fluid rail 86, which will increase the responsiveness of the valve actuator 70 so that the engine 20 may be operated on the late intake valve closing Miller cycle.

When operating the engine 20 on the conventional diesel cycle, the system compression ratio may still be high and the amount of fuel and/or air being supplied to ensure a proper air-to-fuel ratio may also be high for a given desired engine speed, sensed engine speed, and/or engine load. Accordingly, the controller 100 is configured to determine whether the engine 20 needs to be de-rated, that is, whether the amount of fuel being supplied to the cylinders 22 should be reduced for the given desired engine speed, sensed engine speed, and/or engine load. The controller 100 may determine that the engine 20 needs to be de-rated when a viscosity of the fluid being supplied to the fluid actuator 70 is greater than the predetermined desired viscosity level.

The controller 100 may use signals from one or more of the sensors 90, 91 to determine the need to de-rate the engine 20. For example, based on pre-implementation testing, it may be determined that the desired viscosity level is reached when the temperature of the fluid being supplied to the fluid actuators 70 reaches 20° C. Accordingly, one or more of the sensors 90, 91 may sense the fluid temperature directly from the fluid line 85 or fluid rail 86 or indirectly, for example, from the engine coolant temperature and/or another sensed parameter, such as, for example, the intake temperature.

When the engine 20 is operated under the conventional diesel cycle and the fluid temperature is below 20° C., the controller 100 may de-rate the engine 20 by reducing the amount of fuel being supplied to the cylinder 22. The de-rating may be effectuated by eliminating one or more injections in a multiple injection system. For example, the de-rating may be effectuated by eliminating a pilot injection in a pilot/main injection system. In an exemplary embodiment, the fuel supply system 92 may be configured to supply a pilot injection at about 45° before top dead center of a compression stroke and a main injection at about 10° before top dead center of the compression stroke. The pilot injection may last for several degrees of the compression stroke, and the main injection may last until after top dead center of an expansion stroke.

Alternatively, the de-rating may be effectuated by reducing the pilot injection and/or the main injection in a pilot/main injection system or by reducing the injection in a single injection system. By way of example, for a desired engine speed of 1800–2100 rpm, the engine may be de-rated by about 30%. Together with reducing the supply of fuel, the controller 100 may be configured to curtail the system compression ratio of pressurized air supplied to the intake passageway 41 in order to ensure a continued proper air-to-fuel mixture. The reduced fuel supply and/or the lowered air pressure may result in a reduction of the pressure in the cylinder 22 during compression and combustion, thereby preventing damage to the engine 20.

Once the controller 100 receives an indication from one or more of the sensors 90, 91 that the fluid temperature has reached 20° C., the controller 100 may cease de-rating the engine 20. The cessation of de-rating the engine 20 may coincide with implementation of a late intake valve closing Miller cycle operation of the engine 20.

As will be apparent from the foregoing description, the engine operation system may selectively alter the timing of and fuel supply to an internal combustion engine. The operation of the engine may be based on sensed operating conditions of the engine. For example, the engine operation system may implement a late intake valve closing Miller cycle when the engine is operating under normal operating conditions. The late intake valve closing Miller cycle may be disengaged when the engine is operating under adverse operating conditions, such as when the engine is cold. When the late intake valve closing Miller cycle is disengaged, the engine operating system may reduce the supply of fuel to the cylinder to lower the pressure in the cylinder. Thus, the present invention provides a flexible engine operation system that provides for both enhanced cold starting capability and fuel efficiency gains, while reducing the risk of damage to the engine during adverse operating conditions.

It will be apparent to those skilled in the art that various modifications and variations can be made in the described engine operation system without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A system for operating an internal combustion engine including at least one cylinder, comprising:
    an intake valve moveable between a first position at which fluid is blocked from flowing at least one of to and from the cylinder and a second position at which fluid is allowed to pass at least one of to and from the cylinder;
    a fluid actuator selectively operable to hold the intake valve from moving to the first position during a portion of a compression stroke of the engine;
    a source of fluid in fluid communication with the fluid actuator;
    a control valve configured to control a flow of fluid between the source of fluid and the fluid actuator;
    a fuel supply system configured to supply a predetermined amount of fuel to the cylinder at an appropriate time during an engine cycle based on at least one operating parameter of the engine; and
    a controller configured to determine a need to de-rate the engine during an engine cycle in which the fluid actuator is not operated, based on a sensed parameter relating to viscosity of fluid from the source.

2. The system of claim 1, wherein the controller is further configured to move the control valve between a first position blocking flow from the source of fluid to the fluid actuator and a second position allowing flow from the source of fluid to the fluid actuator.

3. The system of claim 2, wherein the fluid actuator includes a piston operatively associated with the intake valve.

4. The system of claim 1, wherein the source of fluid provides fluid having a pressure of between about 210 KPa and 620 KPa to the fluid actuator.

5. The system of claim 1, wherein the source of fluid provides fluid having a pressure of between about 5 MPa and 35 MPa to the fluid actuator.

6. The system of claim 1, wherein the controller is configured to de-rate the engine for an engine cycle in which the sensed parameter indicates a viscosity greater than a predetermined viscosity, and wherein the fluid actuator is disabled at times when the sensed parameter indicates a viscosity greater than the predetermined viscosity.

7. The system of claim 6, wherein the controller is further configured to determine an amount of fuel to be supplied to the cylinder based on at least one additional operating parameter of the engine, and wherein the controller is configured to determine a reduced amount of fuel to de-rate the engine.

8. The system of claim 7, wherein the additional parameter includes at least one of engine speed, engine load, and desired engine speed.

9. The system of claim 7, wherein the controller is further configured to reduce a pressure of air flowing to the cylinder based on the reduced amount of fuel.

10. The system of claim 1, further including a sensor configured to sense the at least one parameter relating to viscosity, wherein the sensed parameter relating to viscosity is at least one of a coolant temperature, an intake passageway temperature, an exhaust passageway temperature, a temperature of fluid supplied to the control valve, and a viscosity of fluid supplied to the control valve.

11. The system of claim 1, wherein the engine is de-rated by reducing an amount of fuel supplied to the engine below the predetermined amount.

12. The system of claim 1, wherein the fuel supply system is configured to supply a pilot injection at about 45° before top dead center of a compression stroke and a main injection at about 10° before top dead center of the compression stroke, wherein the main injection ends after top dead center of an expansion stroke.

13. A method for controlling operation of an engine having a piston moveable in a cylinder of the engine, comprising:
    moving an intake valve between a first position at which fluid is blocked from flowing at least one of to and from the cylinder and a second position at which fluid is allowed to pass at least one of to and from the cylinder during an intake stroke of the piston;
    selectively operating a control valve to hold the intake valve from moving to the first position during at least a portion of the compression stroke of the piston;
    sensing at least one operating parameter of the engine relating to viscosity of a fluid supplied to the control valve; and
    determining a need to de-rate the engine during an engine cycle in which the fluid actuator is not operated, based on the sensed parameter relating to viscosity.

14. The method of claim 13, further including de-rating the engine for an engine cycle in which the sensed parameter indicates a viscosity greater than a predetermined viscosity and in which the fluid actuator is not operated.

15. The method of claim 14, further including disabling the fluid actuator at times when the sensed parameter indicates a viscosity greater than a predetermined viscosity.

16. The method of claim 13, further including determining a predetermined amount of fuel to be supplied to the cylinder based on at least one additional operating parameter of the engine, wherein said de-rating includes determining a reduced amount of fuel to be supplied to the engine.

17. The method of claim 16, further including supplying the reduced amount of fuel to the cylinder.

18. The method of claim 16, wherein the additional parameter includes at least one of engine speed, engine load, and desired engine speed.

19. The method of claim 16, further including reducing a pressure of air flowing to the cylinder based on the reduced amount of fuel.

20. The method of claim 13, wherein the sensed parameter relating to viscosity is at least one of a coolant temperature, an intake passageway temperature, an exhaust passageway temperature, a temperature of fluid supplied to the control valve, and a viscosity of fluid supplied to the control valve.

21. The method of claim 13, wherein the fluid supplied to the control valve has a pressure of between about 210 KPa and 620 KPa.

22. The method of claim 13, wherein the fluid supplied to the control valve has a pressure of between about 5 MPa and 35 MPa.

23. The method of claim 13, wherein said selectively operating includes moving the control valve between a first position preventing flow of fluid to the fluid actuator and a second position allowing flow of fluid to the fluid actuator.

24. A method of controlling operation of an engine having a piston moveable in a cylinder of the engine through an intake stroke followed by a compression stroke, comprising:

moving an intake valve between a first position at which fluid is blocked from flowing at least one of to and from the cylinder and a second position at which fluid is allowed to pass at least one of to and from the cylinder during the intake stroke of the piston;

selectively operating a control valve to hold the intake valve from moving to the first position during at least a portion of the compression stroke of the piston;

sensing at least one operating parameter of the engine relating to viscosity of a fluid supplied to the control valve;

determining a predetermined amount of fuel to be supplied to the cylinder at an appropriate time during an engine cycle based on at least one additional operating parameter of the engine; and de-rating the engine during an engine cycle in which the fluid actuator is not operated, based on the sensed parameter relating to viscosity.

25. The method of claim 24, wherein said de-rating includes determining a reduced amount of fuel to be supplied to the engine, and wherein the method further includes supplying the reduced amount of fuel to the cylinder during an engine cycle.

26. The method of claim 24, wherein the engine is de-rated for an engine cycle in which the sensed parameter indicates a viscosity greater than a predetermined viscosity and the fluid actuator is not operated.

27. The method of claim 24, wherein the sensed operating parameter relating to viscosity is at least one of a coolant temperature, an intake passageway temperature, an exhaust passageway temperature, a temperature of fluid supplied to the control valve, and a viscosity of fluid supplied to the control valve.

28. An engine, comprising:

an engine having a block defining at least one cylinder and a cylinder head having at least one intake passageway leading to the at least one cylinder;

at least one intake valve moveable between a first position at which fluid is blocked from flowing at least one of to and from the cylinder and a second position at which fluid is allowed to pass at least one of to and from the cylinder;

a fluid actuator configured to selectively hold the intake valve from moving to the first position during at least a portion of a compression stroke of the engine;

a source of fluid in fluid communication with the fluid actuator;

a control valve disposed between the source of fluid and the fluid actuator and moveable between a first position to block a flow of fluid between the source of fluid and the fluid actuator and second position to allow the flow of fluid from the source of fluid to the fluid actuator;

a fuel supply system configured to supply a predetermined amount of fuel to the cylinder at an appropriate time during an engine cycle based on at least one operating parameter of the engine;

a sensor configured to sense a parameter relating to viscosity of fluid from the source; and a controller electrically coupled to the control valve and the fuel supply system, the controller being configured to actuate the control valve and to reduce the amount of fuel during an engine cycle in which the fluid actuator is not operated, based on the sensed parameter.

29. The engine of claim 28, wherein the sensed parameter relating to viscosity is at least one of a coolant temperature, an intake passageway temperature, an exhaust passageway temperature, a temperature of fluid supplied to the control valve, and a viscosity of fluid supplied to the control valve.

30. The engine of claim 28, wherein the source of fluid provides fluid having a pressure of between about 210 KPa and 620 KPa to the fluid actuator.

* * * * *

UNITED STATES PATENT AND TRADEMARK OFFICE
CERTIFICATE OF CORRECTION

PATENT NO. : 6,799,552 B2
DATED : October 5, 2004
INVENTOR(S) : Thomas J. Crowell et al.

It is certified that error appears in the above-identified patent and that said Letters Patent is hereby corrected as shown below:

Title page,
Item [56], References Cited, U.S. PATENT DOCUMENTS, please add:
-- US 6,092,495     07/2000   Hackett
   US 6,477,996 B2  11/2002   Ogawa
   US 6,125,828     10/2000   Hu
   US 6,173,684 B1  01/2001   Buehrle, II et al.
   US 6,167,853 B1  01/2001   Letsche
   US 6,474,295 B2  11/2002   Milam
   US 6,601,553 B1  08/2003   Vattaneo et al.
   US 6,604,497 B2  08/2003   Buehrle, II et al.
   US 6,644,271 B1  11/2003   Cotton, III --

Signed and Sealed this

Fifth Day of April, 2005

JON W. DUDAS
*Director of the United States Patent and Trademark Office*